Figure 5:
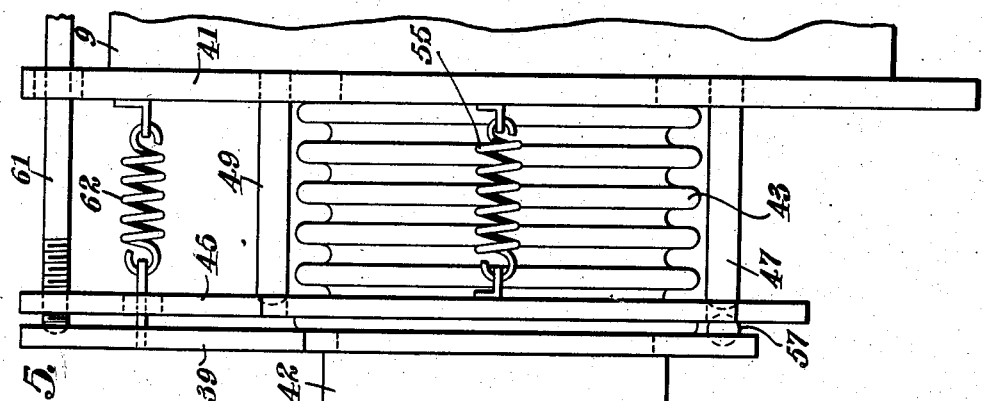

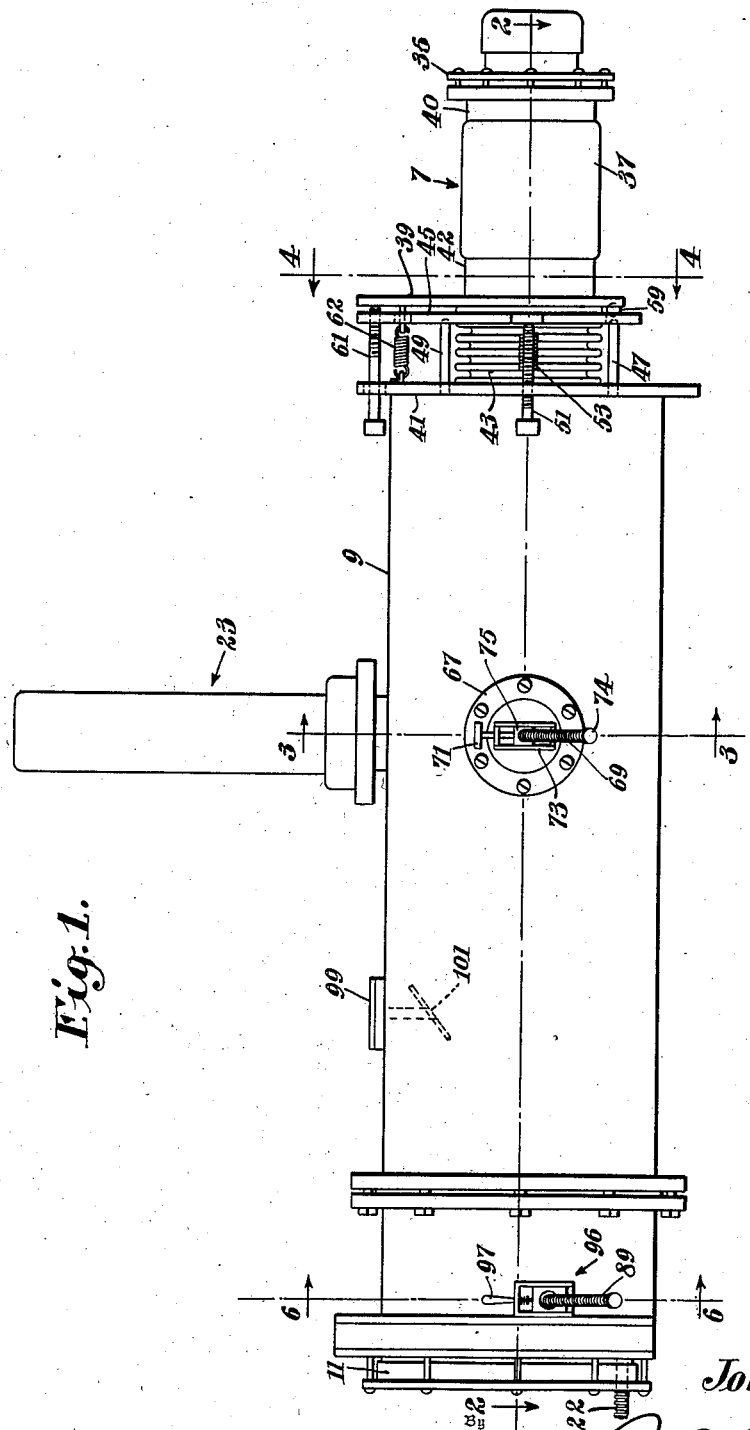

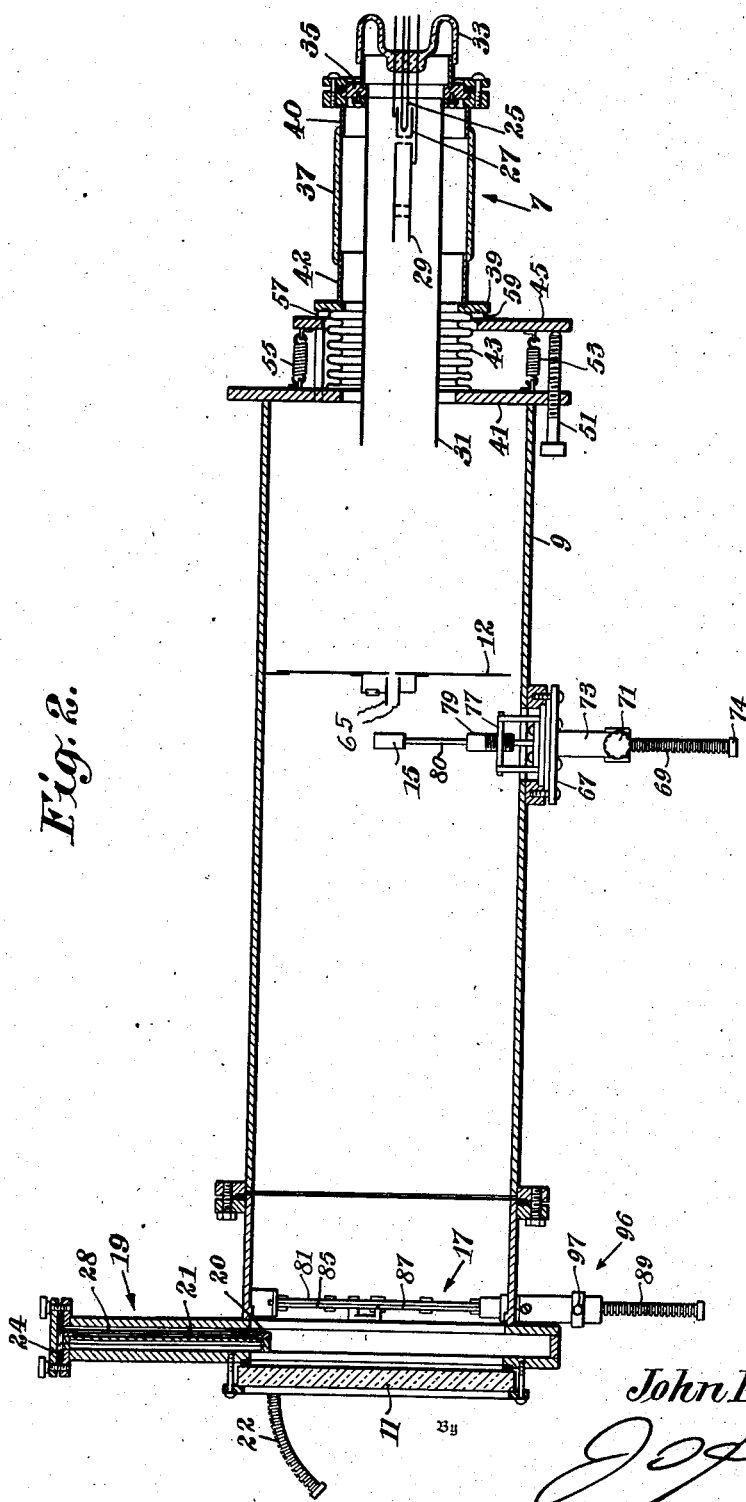

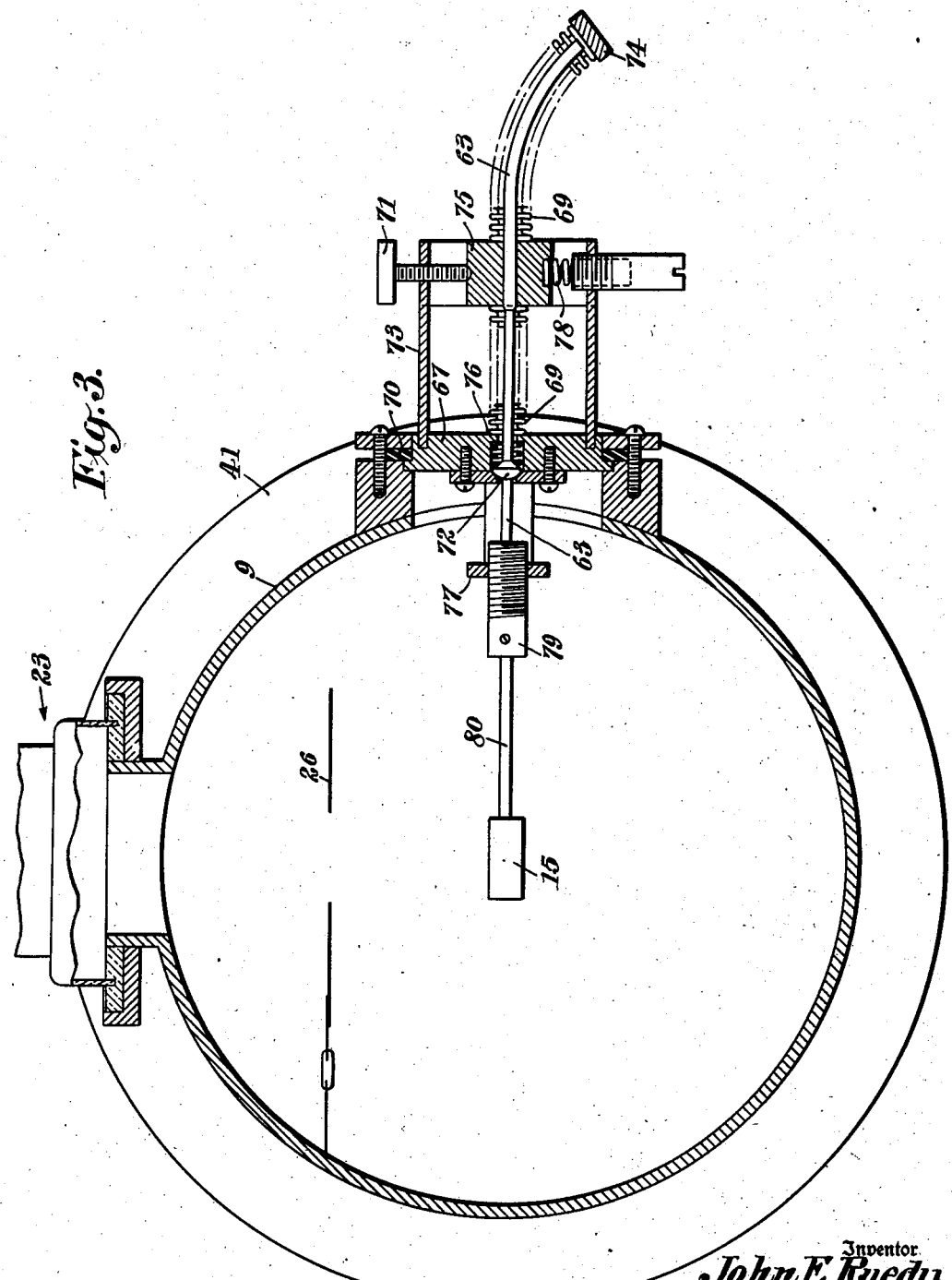

March 3, 1942.   J. E. RUEDY   2,275,234
ELECTRON DIFFRACTION CAMERA
Filed April 25, 1940   5 Sheets-Sheet 4

Inventor
John E. Ruedy,
By
Attorney

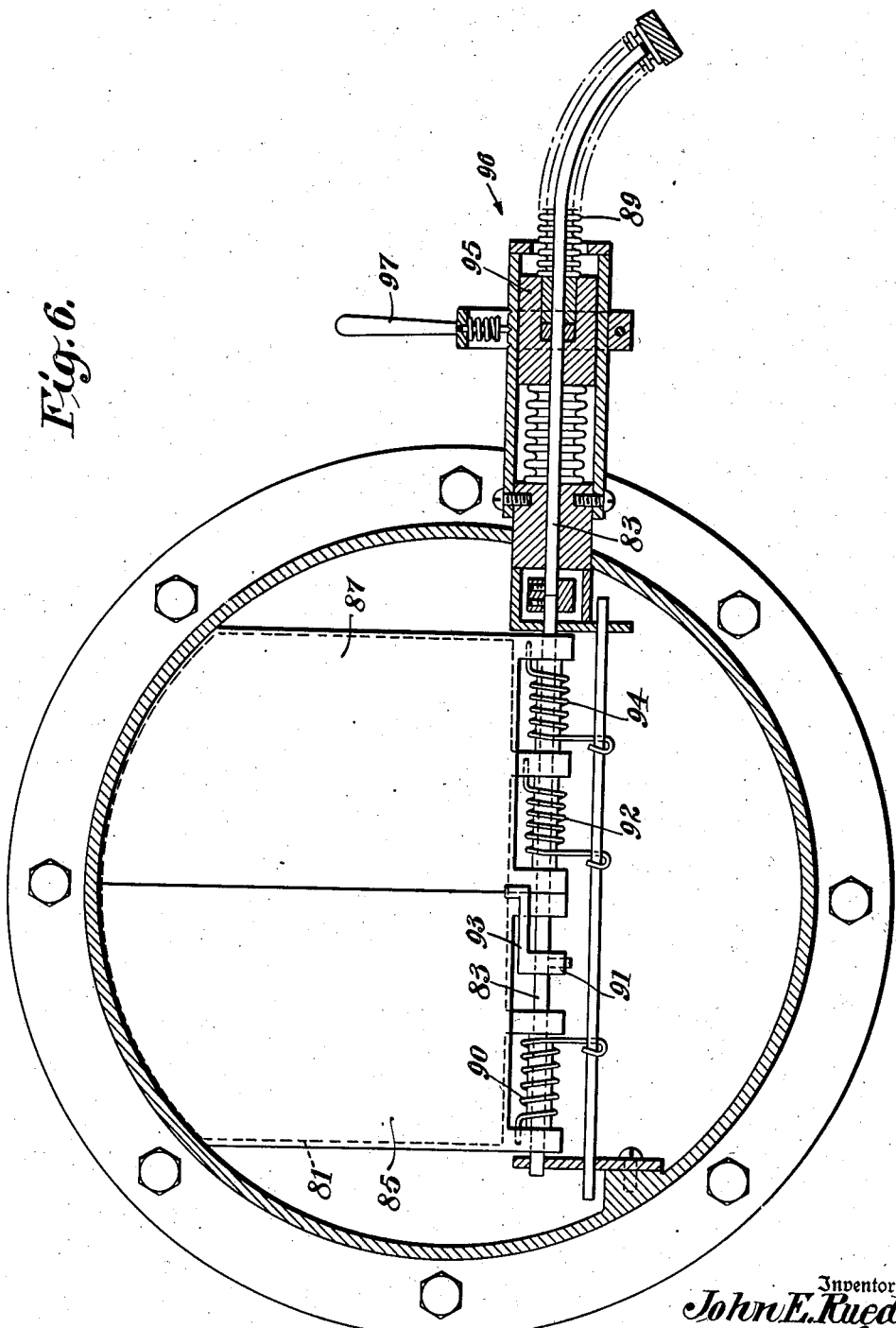

Patented Mar. 3, 1942

2,275,234

UNITED STATES PATENT OFFICE 2,275,234

ELECTRON DIFFRACTION CAMERA

John E. Ruedy, Merchantville, N. J., assignor to Radio Corporation of America, a corporation of Delaware Application April 25, 1940, Serial No. 331,620

5 Claims. (Cl. 250—49.5)

This invention relates to the electron diffraction examination of the surface of materials, and particularly to an improved electron diffraction camera in which visual observations or photographic records of electron diffraction patterns may be made.

Electron diffraction cameras of the general type described in the present application have been in use in the art for several years. One such camera is described and illustrated in an article by M. L. Fuller appearing in "Metals and Alloys" for March and April 1939. By means of such a camera, it is possible to study the atomic surface structure of various materials, and to determine changes in this structure which result from various treatments. The principle of operation of electron diffraction cameras is similar to that utilized in the X-ray diffraction method of examination. That is, the indication obtained depends upon the interaction of a beam of electrons and the atomic structure of the material under observation. The electron method of examination, however, differs from the X-ray system in that in the former case the penetration of the electrons into the material is limited to a depth much less than the depth of penetration in the latter case. Consequently, the particular application of the electron diffraction camera is the study of the outermost surface of the specimen.

The study of photo or secondary electron emission from a complex substance is also materially aided by a knowledge of the atomic structure of the surface of the photo-emissive substance, and a knowledge of the changes which are produced therein during various treatments. It is, therefore, one of the objects of this invention to provide an electron diffraction camera which makes possible the study and observation of the surface structure of a photo or secondary electron emissive surface when under bombardment by a source of electrons. Other objects of this invention include the provision of an improved specimen holder which permits the selection and accurate positioning within the camera of any one of a number of specimens; the provision of an improved arrangement for mounting the primary electron source at the end of the camera chamber; and the provision of an improved shutter mechanism adjacent the fluorescent screen or photographic plate of the camera by means of which a selected portion of the screen or plate may be exposed to the electron beam.

Briefly, the foregoing objects are accomplished by providing a high intensity electron beam which is suitably focused and concentrated and caused to graze or penetrate the surface of a specimen. The specimen is mounted on a specimen holder which permits the adjustment of its lateral angle as well as its vertical position. These elements are mounted within an evacuated chamber which also contains a photographic plate and a fluorescent screen suitably positioned in the path of the electrons which have been diffracted from the surface of the specimen. The adjustments of the specimen, the photographic plate, the shutter, and the electron beam are made by control mechanisms which may be readily manipulated during the operation of the device. Metallic bellows are employed to seal the evacuated chamber against leakage at all control points.

Figure 4:
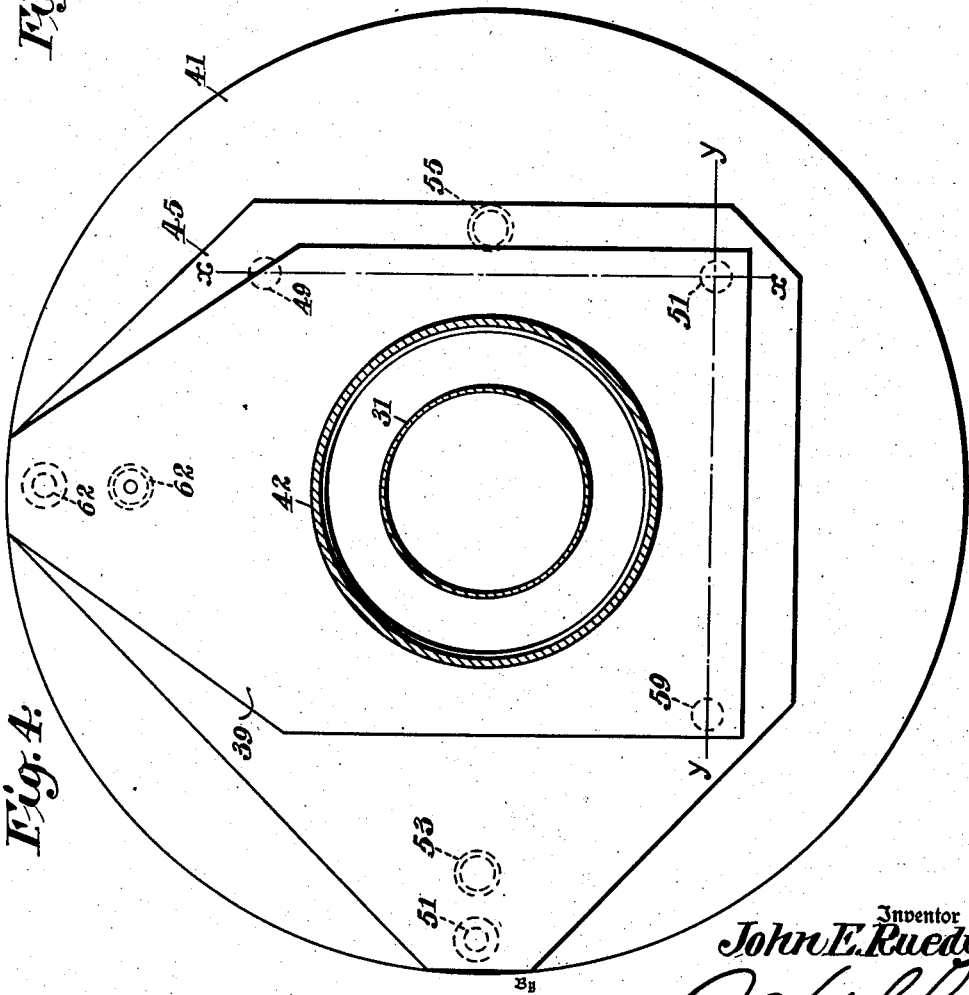

This invention will be better understood from the following description when considered in connection with the accompanying drawings in which Figure 1 is a side elevation of an electron diffraction camera; Figure 2 is a section view taken on the line 2-2 of Figure 1; Figure 3 is a sectional view illustrating the details of the specimen holder taken on the line 3-3 of Figure 1; Figure 4 is a view of the mounting mechanism taken on the line 4-4 of Figure 1; Figure 5 is a side elevation of the mounting mechanism; and Figure 6 is a sectional view of a portion of the camera illustrating the details of the shutter mechanism taken on the line 6-6. Similar reference numerals refer to similar parts throughout the several drawings.

Referring to Figs. 1 and 2, the camera includes an electron gun 7 adjustably mounted on one end of an evacuated cylindrical chamber 9, the far end of which is sealed by a glass plate 11. The inner surface of the glass plate 11 is coated with a fluorescent material. Within the evacuated chamber 9 an apertured diaphragm 12 is located between the electron gun 7 and the specimen 15 which is to be studied. A shutter 17 is mounted across the chamber adjacent to the fluorescent screen and the glass plate 11 in order to shield the fluorescent screen or photographic plate from electrons from the electron gun during initial stages of the adjustment of the device. A film chamber 19 encloses a photographic plate 21 and holder 20 which may be moved into the path of the electrons, when desired, by means of a rack and pinion located at the bottom of the plate holder. The rack is operated by a crank sealed within a flexible metallic bellows 22. The covered plate and holder are placed in the chamber, which is then sealed by a rubber gasket 24. Turning the crank moves the holder and plate into the camera. The plate cover 28, however, is held stationary so that the portion of the plate within the camera is uncovered.

A second electron gun 23 is mounted on the evacuated chamber 9 so as to project a stream of low velocity electrons directly onto the surface of the specimen. An anode electrode 26 (Fig. 3) is mounted near the specimen to collect the secondary electrons. The electron gun serves two purposes. In the first place, it permits the observation of the surface of secondary electron emissive substance when under direct bombardment of the electrons. In the second place, it has been found that specimens of insulating material such as mica, and the like, tend to accumulate a static charge by reason of the effect of the electron beam. This static charge is highly undesirable as it tends to deflect the beam and interfere with the observation. It is not possible to remove the static charge by grounding the specimen if the specimen is a nonconductor. However, by suitably controlling the intensity of the directly impinging electrons from the second electron gun 23, secondary emission may be produced which is sufficient to maintain the static potential of the specimen at a low value. Thus, the accumulation of electrons from the gun 7 which tends to produce a negative charge on the specimen is balanced by an equal loss of secondary electrons produced by the impinging electrons from the auxiliary gun 23. This auxiliary gun may be similar to the principal gun 7, or may be of any other suitable type.

The electron gun 7 preferably consists of a small tungsten wire cathode 25, a grid cylinder 27 having an aperture of the order of .030 inch, and a first anode cylinder 29 of the same diameter, spaced .040 inch from the grid cylinder 27. The first anode cylinder, through which the electrons pass, contains three successive apertures the diameters of which are .0055, .020 and .030 inch, respectively, in the order named from the grid electrode. A second anode cylinder 31 of larger diameter and enclosing the cathode, grid and first anode electrodes, and an accelerating cylinder which is the main body of the evacuated chamber 9 complete the elements required for producing and focusing the primary electron beam. The dimensions given above are given merely by way of example, and are not to be considered as limitations, since the electron gun arrangement may be considerably varied, as is well known to those skilled in the art.

While the electrical connections to the various elements have not been illustrated, it is considered preferable to operate the cathode at a high negative potential and the accelerating electrode (the main chamber of the camera) at ground potential. Other negative potentials are applied to the anode and grid electrodes in a manner well known to those skilled in the art.

The cathode, grid and first anode are mounted on a glass press 33 which is sealed to a brass ring 35 which also supports the second anode cylinder 31. The entire assembly is connected by a glass tube 37 to a mounting ring or plate 39 through suitable sealing members 40 and 42 which make vacuum-tight connections. The mounting ring or plate 39 is sealed to the end plate 41 of the main vacuum chamber 9 by means of a flexible bellows 43, thus permitting the position of the electron gun to be adjusted in order to focus the electron beam accurately on the aperture in the diaphragm 12.

The adjusting mechanism for the electron gun is best described by referring to Figs. 4 and 5 in addition to Figs. 1 and 2. A second mounting ring or plate 45, having an aperture through which the bellows 43 freely passes, is pivotally mounted on the end plate 41 of the camera chamber at three points. Two mounting studs 47 and 49 vertically positioned with respect to one another, and an adjustable mounting stud 51 are socketed in and support the second mounting plate at three points. The plate 45 is held against the supporting studs by a pair of springs 53 and 55. The adjustable supporting stud 51 is threaded into the end plate 41 so that the plate 45 is rotated about a vertical axis $x$—$x$ passing through studs 47 and 49 by rotating the adjustable stud 51.

The mounting ring or plate 39 is similarly supported at three points on the second mounting plate 45, but in this instance, the axis of rotation $y$—$y$ of the mounting plate 39 is in a horizontal plane. For convenience, the two mounting plates are maintained at a fixed distance from each other along the axis of rotation of the mounting ring 39 by means of a pair of ball bearings 57 and 59 which are seated in corresponding recesses in the opposed surfaces of the two plates. The third support for the mounting plate 39 is an adjustable set screw 61 which is threaded through the mounting plate 45 and provides a bearing surface for the mounting plate 39. The plate is held against the bearing surface of the set screw 61 by means of a spring 62. The adjustment of this set screw 61 causes the supporting plate 39 and the attached electron gun mechanism to swing through a small angle about the horizontal axis $y$—$y$, thus elevating or lowering the electron beam. The beam is moved in a horizontal plane by the set screw 51 as has been described above. Accordingly, the beam is adjusted so that it passes through the small aperture in the diaphragm 12 located in the chamber of the camera. The diameter of this aperture is of the order of .01 inch.

Referring again to Fig. 2, it will be observed that, after passing through the diaphragm 13, the beam passes through a pair of oppositely disposed deflecting electrodes 65 which are connected to sources of suitable D. C. potential, and which are utilized to control the direction of the beam in the conventional manner. The purpose of the diaphragm 13 is to sharpen the beam and to cut off stray electrons.

The specimen mounting element is best described by referring to Figs. 2 and 3. This device is mounted on a suitable opening in one side of the camera chamber, and is provided with a rubber gasket 70 for establishing a vacuum tight seal.

The element itself consists of a base plate 67 which is screwed into the camera chamber and which supports the other elements of the device. A piece of drill rod 63 passes through a central aperture in the base plate and is pivotally mounted therein for rotation by means of a ball and socket bearing 72, and also has limited freedom of movement in a vertical direction. A portion of the outer end of the drill rod is bent at a small angle to the major axis of the rod to form a crank. A flexible metallic bellows 69 surrounds the outer portion of the rod. The outer end 73 of the bellows is closed to form a vacuum tight seal. The inner end of the bellows 69 is soldered at point 76 to the base plate 67, thus forming a vacuum-tight seal around the crank rod.

Limited vertical movement of the bellows and crank rod is provided by means of a thumb screw 71 which is threaded into a supporting member 73 connected to the outer surface of the base plate 67. The thumb screw 71 presses against a block 75 which is sealed to the bellows 69. A spring bias 78 is provided to hold the block 75 against the thumb screw 71.

The portion of the specimen supporting device which extends within the camera chamber includes a supporting plate 77 which is pivotally supported by the base plate 67. A horizontal adjusting screw 79 is threaded into the supporting plate 77 and keyed for rotation with the inner end of the drill rod 63. One or more specimens which are to be studied are supported by the adjusting screw in any suitable manner. For example, an extension rod 80 may be used to support the specimen 15 in the electron path. It will be appreciated that translational motion of the specimen in the direction of the vertical diameter of the camera chamber is obtained by turning the adjustable thumb screw 71, and that the specimen may be rotated about a horizontal axis by turning the crank formed by the bent section of the bellows and the drill rod. One complete revolution of this crank will cause the specimen to move along the axis of the rod 63 by an amount determined by the pitch of the horizontal adjusting screw 79. By mounting four specimens at oppositely positioned points about the axis of rotation, any one of the four may be selected for observation by rotating the crank. In addition, the angle of incidence of the electron beam on the specimen may also be adjusted by a slight movement of the crank. Different portions of the surface of the specimens may be brought into the electron beam by continuously rotating the crank until the adjusting screw has moved in or out the desired distance.

The shutter mechanism is best described by reference to Fig. 6. This is a view looking into the end of the camera, the glass plate 11 being removed. The shutter mechanism includes three separate shutters. To the rear, that is, toward the electron source, a large shutter 81 which completely shields the fluorescent screen or photographic plate is pivotally mounted on a rod 83 which extends across the camera chamber at a distance somewhat below its horizontal diameter. In addition, a pair of small shutters 85 and 87 are similarly mounted on the rod 83, and are so shaped that either half of the fluorescent screen or photographic plate may be shielded from the electron beam. All three shutters are provided with spring bias means 90, 92 and 94 for maintaining them in a normally vertical position parallel to the fluorescent screen.

In order to control the position of the various screens a crank 96 is utilized which, as before, is sealed against leakage by means of a section of flexible metallic bellows 89. The crank rod within the flexible bellows 89 is a continuation of or is connected to the shaft 83 upon which the various shutters are hinged. A collar 91 having a projecting finger 93 is fixedly attached to the crank rod 83 at a position near the adjacent edges of the split shutter sections 85 and 87. The crank shaft 83 is also collared to a block 95, outside the camera chamber, which is sealed to the camera chamber by means of a bellows 96 and which may be moved axially by means of a lever 97. Operating the lever causes the collar 91 to move into such a position that the finger 93 engages either of the two shutter sections independently, or both of them together. It will be observed that when the crank is turned to depress either one of the two shutters 85 or 87 that a large shutter 81 is also depressed.

It has also been found helpful to provide a fluorescent coating on the inner surface of the large shutter 81 so that observations may be made of the initial adjustment of the electron beam and the specimen. In order to observe the luminescent pattern produced by the electrons upon this surface, a small window 99 has been provided in the camera chamber. A mirror 101 is mounted below the window by means of which it is possible to observe the inner surface of the shutter 81, upon which the fluorescent material has been deposited.

I have thus described an improved electron diffraction camera which provides a secondary electron source for studying secondary electron emissive surfaces under operating conditions, and which includes improved adjusting controls which permit all necessary adjustments to be made within the camera during its operation.

I claim as my invention:

1. A holder for adjustably mounting a specimen within an electronic device so as to be impinged by an electron beam and operable to adjust the position of the point of impact at any point on the surface of said specimen as well as the angle of incidence of said beam on the surface of said specimen, comprising a base plate for mounting said holder on said chamber, a control rod extending therethrough and pivotally mounted therein, said rod having an outer end portion at an angle to the axis thereof, a vacuum tight flexible bellows enclosing the outer portion of said rod and sealed to said base plate, a supporting plate pivotally supported by said base plate and extending within said chamber, a horizontal adjusting screw threaded into said supporting plate and keyed for rotation with the inner portion of said rod, and means for supporting a specimen by said adjusting screw.

2. A holder for adjustably mounting a specimen within an electronic device so as to be impinged by an electron beam and operable to adjust the position of the point of impact at any point on the surface of said specimen as well as the angle of incidence of said beam on the surface of said specimen, comprising a base plate, a control rod extending therethrough and pivotally mounted therein, said rod having an outer end portion at an angle to the major axis thereof, a vacuum tight flexible metallic bellows enclosing the outer portion of said rod and connected to said base plate to establish a vacuum tight connection therebetween, a supporting plate pivotally supported parallel to said base plate and positioned inwardly therefrom, a horizontal adjusting screw threaded into said supporting plate and keyed to the inner end of said rod, whereby rotation of said rod causes said screw to rotate and to move in a direction perpendicular to said base plate, and means for supporting a specimen on said adjusting screw in the path of said electron beam.

3. A holder for mounting a specimen in a beam of electrons within an evacuated chamber and operable to adjust the angle of incidence of said electron beam on said specimen as well as the position of said specimen in said beam comprising a base plate for mounting on said chamber, a control rod extending through said base plate and pivotally mounted therein, said rod having an outer end portion bent at an angle to the axis of said rod, flexible means establishing a vacuum tight enclosure around said rod, a supporting plate supported by said base plate within said chamber, a horizontal adjusting screw threaded into said supporting plate and keyed for rotation with said rod whereby it may be moved in the direction of the axis of said rod, and means for mounting a specimen on said adjusting screw so that a slight rotation of said screw adjusts the angle of incidence of the beam on the surface of said specimen and a full revolution causes a different portion of said surface to be impinged by said beam.

4. In an electronic device in which a specimen to be examined is positioned in a beam of electrons within an evacuated chamber, an adjustable specimen holder comprising a base plate fixedly mounted on said device, a control rod extending through said base plate into said chamber and having its axis perpendicular to the axis of said beam, a supporting plate pivotally mounted on and parallel to said base plate, an adjusting screw threaded into said supporting plate, and coupled to said rod for rotation therewith, means for mounting a specimen on said adjusting screw, adjustable means controlling the angle between said base plate and the axis of said rod to thereby vary the position of said specimen in said beam, and means for rotating said rod through small angles to vary the angle of incidence of said beam and the surface of said specimen, the lateral position of said specimen being controlled by rotating said adjusting screw multiples of one revolution.

5. An adjustable specimen holder having three modes of adjustment comprising a base plate, a control rod extending therethrough and pivotally mounted therein for rotation about an axis perpendicular to the longitudinal axis of said rod, means for rotating said rod about its longitudinal axis, a supporting plate pivotally supported parallel to said base plate and spaced therefrom, an adjusting screw threaded into said supporting plate in line with said rod, said adjusting screw being keyed to the end of said rod so that it rotates with said rod and moves along the axis of said rod, and means for mounting a specimen on said adjusting screw whereby a slight rotation of said rod controls the first mode of adjustment of said specimen, a complete turn of said rod controls the second mode of adjustment of said specimen, and rotation of said rod about said perpendicular axis controls the third mode of adjustment.

JOHN E. RUEDY.